US010182176B2

(12) United States Patent
Harada

(10) Patent No.: US 10,182,176 B2
(45) Date of Patent: Jan. 15, 2019

(54) IMAGE PROCESSING APPARATUS AND IMAGE PROCESSING METHOD THAT ENSURE IMPROVED VISIBILITY OF CHARACTER AFTER CONVERSION INTO MONOCHROME IMAGE DATA, AND RECORDING MEDIUM THEREFOR

(71) Applicant: Kyocera Document Solutions Inc., Osaka (JP)

(72) Inventor: Takashi Harada, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 15/626,047

(22) Filed: Jun. 16, 2017

(65) Prior Publication Data

US 2017/0366707 A1    Dec. 21, 2017

(30) Foreign Application Priority Data

Jun. 16, 2016    (JP) .................................. 2016-120305

(51) Int. Cl.
*H04N 1/40* (2006.01)
*H04N 1/00* (2006.01)
(Continued)

(52) U.S. Cl.
CPC ..... *H04N 1/40012* (2013.01); *H04N 1/00331* (2013.01); *H04N 1/40062* (2013.01);
(Continued)

(58) Field of Classification Search
CPC combination set(s) only.
See application file for complete search history.

(56) References Cited

U.S. PATENT DOCUMENTS 5,872,573 A * 2/1999 Adegeest ................ G06T 11/60
345/621
7,382,494 B2 * 6/2008 McElvain .............. G06K 15/02
358/1.15

(Continued)

FOREIGN PATENT DOCUMENTS

| JP | 2001-028686 A | 1/2001 |
| JP | 2006-121674 A | 5/2006 |
| JP | 2013-077961 | 4/2013 |

*Primary Examiner* — Barbara D Reinier
(74) *Attorney, Agent, or Firm* — HEA Law PLLC

(57) ABSTRACT

An image processing apparatus includes an image-data acquiring unit, a character recognition processing unit, and a monochrome conversion unit. The image-data acquiring unit acquires image data representing an image including a character. The character recognition processing unit performs a character recognition process on the image data to extract a character region. The character region is a region where the character is represented. The monochrome conversion unit converts the image data into monochrome image data when the image data is color image data including a color image. The monochrome image data includes a monochrome image representing the color image with a single color. When a tone difference between the extracted character region and an adjacent region is smaller than a predetermined threshold, the monochrome conversion unit changes a tone of a boundary region between the character region and the adjacent region adjacent to the character region.

7 Claims, 6 Drawing Sheets

(51) Int. Cl.
*H04N 1/409* (2006.01)
*H04N 1/58* (2006.01)

(52) U.S. Cl.
CPC ............. *H04N 1/4092* (2013.01); *H04N 1/58* (2013.01); *H04N 2201/0082* (2013.01)

(56) References Cited

U.S. PATENT DOCUMENTS

| | | | | |
|---|---|---|---|---|
| 7,688,472 | B2* | 3/2010 | McElvain | G06K 15/02 358/1.15 |
| 2002/0037100 | A1* | 3/2002 | Toda | G06T 9/00 382/166 |
| 2004/0080789 | A1* | 4/2004 | Anderson | H04N 1/40012 358/2.1 |
| 2005/0180645 | A1* | 8/2005 | Hasegawa | G06K 9/00456 382/239 |

* cited by examiner

IMAGE PROCESSING APPARATUS AND IMAGE PROCESSING METHOD THAT ENSURE IMPROVED VISIBILITY OF CHARACTER AFTER CONVERSION INTO MONOCHROME IMAGE DATA, AND RECORDING MEDIUM THEREFOR

INCORPORATION BY REFERENCE

This application is based upon, and claims the benefit of priority from, corresponding Japanese Patent Application No. 2016-120305 filed in the Japan Patent Office on Jun. 16, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus reads a color image on an original document to print not only the color image but also a monochrome image, which is preferred in terms of cost reduction. When the monochrome image is printed from the color image on the original document, color image data is converted into monochrome image data. The conversion into the monochrome image data converts RGB information (R: red, G: green, B: blue) into single-color-grayscale information. This causes information on hue and saturation to be lost. Thus, when a print density difference between adjacent regions is small, it is difficult to distinguish a boundary between the adjacent regions in the printed image.

On the other hand, visibility of a printed matter after the monochrome conversion is different for each user, and the users have respective preferences. Thus, the obtained printed matter may be a printed matter different from an image intended by the user. To solve such problem, for example, there is proposed a technique that performs a preview display of a plurality of pieces of alternative image data having different print densities of two adjacent regions in a monochrome image on an operation panel to enable the user to select the alternative image data.

SUMMARY

An image processing apparatus according to one aspect of the disclosure includes an image-data acquiring unit, a character recognition processing unit, and a monochrome conversion unit. The image-data acquiring unit acquires image data representing an image including a character. The character recognition processing unit performs a character recognition process on the image data to extract a character region. The character region is a region where the character is represented. The monochrome conversion unit converts the image data into monochrome image data when the image data is color image data including a color image. The monochrome image data includes a monochrome image representing the color image with a single color. When a tone difference between the extracted character region and an adjacent region is smaller than a predetermined threshold, the monochrome conversion unit changes a tone of a boundary region between the character region and the adjacent region. The adjacent region is a region adjacent to the character region.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
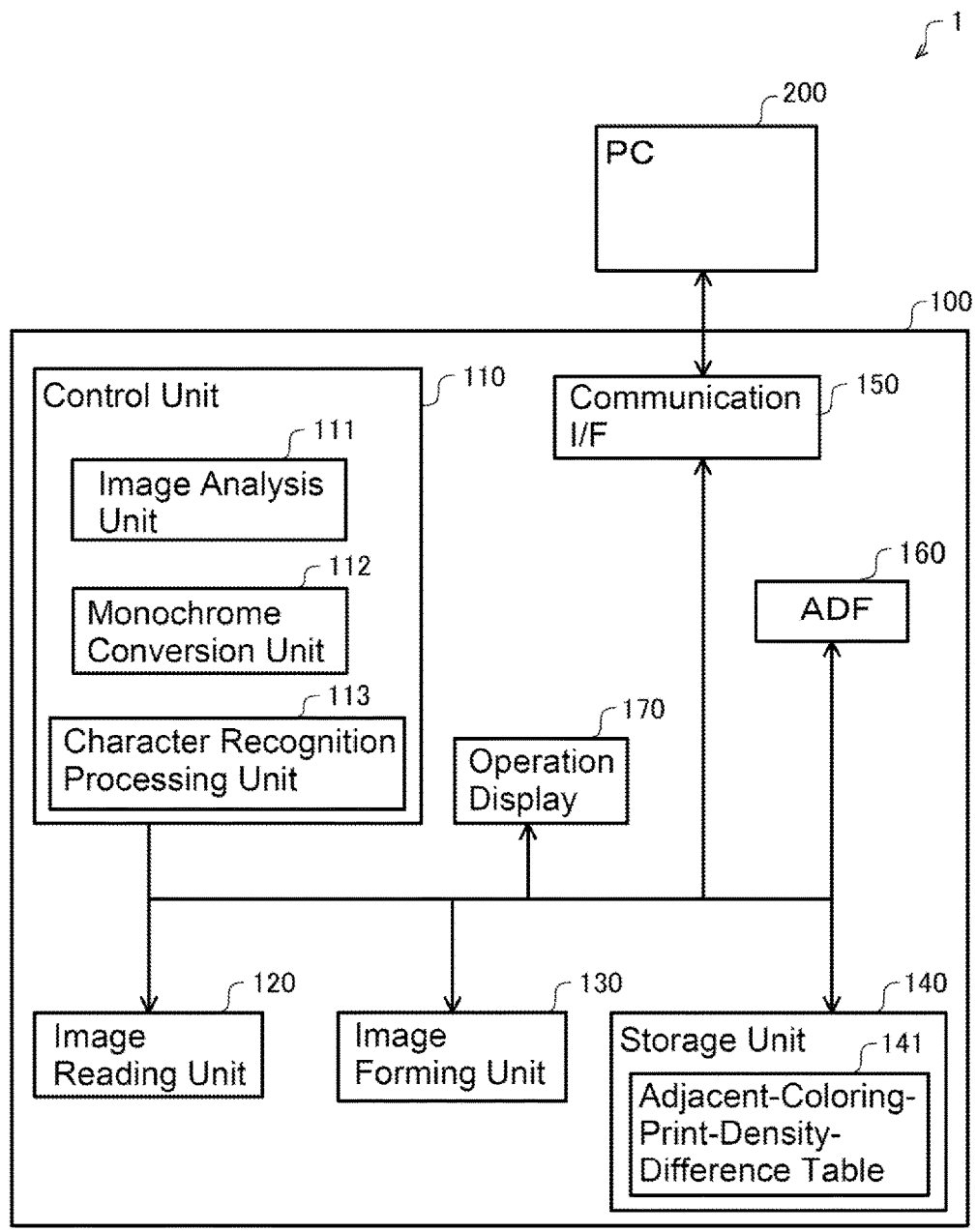
FIG. 1 illustrates a block diagram illustrating a functional configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

FIG. 1 illustrates a block diagram illustrating a functional configuration of an image forming system 1 according to one embodiment of the disclosure. The image forming system 1 includes an image forming apparatus 100 and a personal computer 200. The image forming apparatus 100 includes a control unit 110, an image reading unit 120, an image forming unit 130, a storage unit 140, a communication interface unit 150, an automatic document feeder (ADF) 160, and an operation display 170. The control unit 110 includes an image analysis unit 111, a monochrome conversion unit 112, and a character recognition processing unit 113.

The image forming apparatus 100 is connected to the personal computer 200 using the communication interface unit 150. The personal computer 200 also functions as the image analysis unit 111 and the monochrome conversion unit 112, which are included in the control unit 110. The image forming apparatus 100 forms an image based on the image data received from the personal computer 200.

The control unit 110 includes a main storage unit, such as a RAM and a ROM, and a control unit, such as a microprocessing unit (MPU) and a central processing unit (CPU). The control unit 110 has a controller function related to an interface, such as various I/Os, a universal serial bus (USB), a bus, and another hardware, and controls the entire image forming apparatus 100.

The storage unit 140 is a storage device constituted of a hard disk drive, a flash memory, or a similar medium, which are non-transitory recording media, and stores control programs and data for processes performed by the control unit 110. The storage unit 140 further stores an adjacent-coloring-print-density-difference table 141 storing thresholds.

The operation display 170 functions as a touch panel to display various menus as an entry screen. Further, the operation display 170 accepts an operation input by a user from various kinds of buttons and switches (not illustrated).

Figure 2:
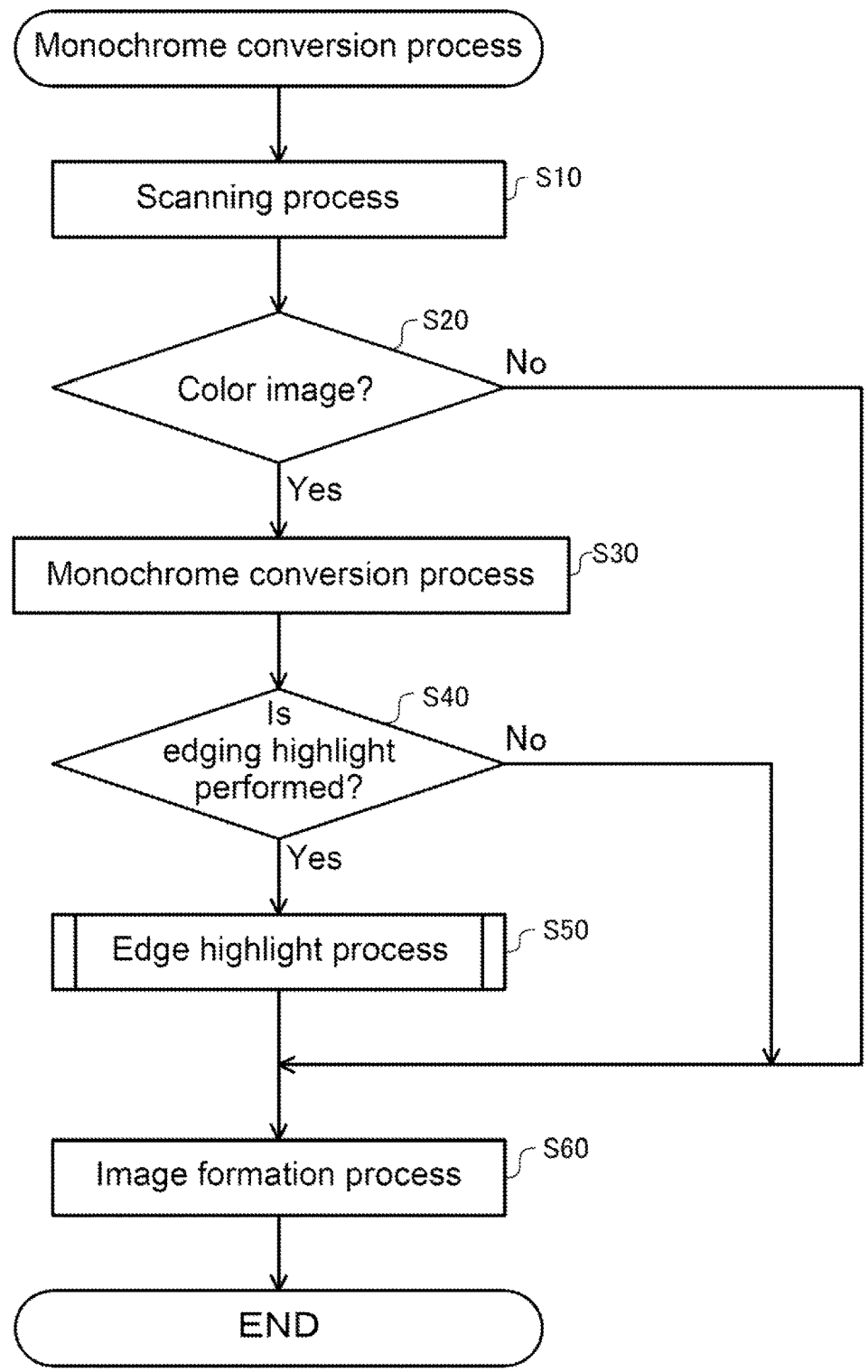
FIG. 2 illustrates contents of a monochrome conversion process according to the one embodiment.

FIG. 2 illustrates contents of a monochrome conversion process according to the one embodiment. The monochrome conversion process of the embodiment is a process that converts color image data into monochrome image data while preventing a reduced visibility of a character.

At Step S10, the image reading unit 120 performs a scanning process. The scanning process is a process that reads an original document using the ADF 160 or a platen (not illustrated). In this example, the image reading unit 120 and the ADF 160 (or the platen) function as an image-data acquiring unit that acquires image data. The acquisition of the image data is performed as, for example, also a reception of a print job from the personal computer 200.

At Step S20, the image analysis unit 111 determines that the original document is a color document or a monochrome document so as to generate color image data or monochrome image data based on the result of this determination.

When the original document is determined to be a color document, the control unit 110 advances the process to Step S30. When the original document is determined to be a monochrome document, the control unit 110 advances the process to Step S60. At Step S60, the image forming unit 130 forms an image on a print medium based on the image data.

At Step S30, the monochrome conversion unit 112 performs the monochrome conversion process. The monochrome conversion process is a process that converts the color image data into monochrome image data. The color image data includes respective tone values of RGB. The monochrome image data represents a color image with a single color and is grayscale image data having a single tone value. The monochrome image data does not include information on hue and saturation. The monochrome conversion process ensures the calculation from the respective tone values of RGB using, for example, a National Television System Committee (NTSC) weighted-average method.

For example, the following calculating formula achieves the NTSC weighted average method. The NTSC weighted average method is also a method of calculating a luminance value.

$$Y=(0.298912 \times R+0.586611 \times G+0.114478 \times B)$$

At Step S40, the control unit 110 determines whether to perform an edge highlight process or not. The edge highlight process is a process that improves the visibility of a contour in an image region representing a character. The determination whether to perform the edge highlight process or not is performed by, for example, inquiring of the user on the operation display 170. The image forming apparatus 100 may be configured such that the user is inquired, for example, when the original document is determined as a color document and monochrome printing is designated.

Figure 3:
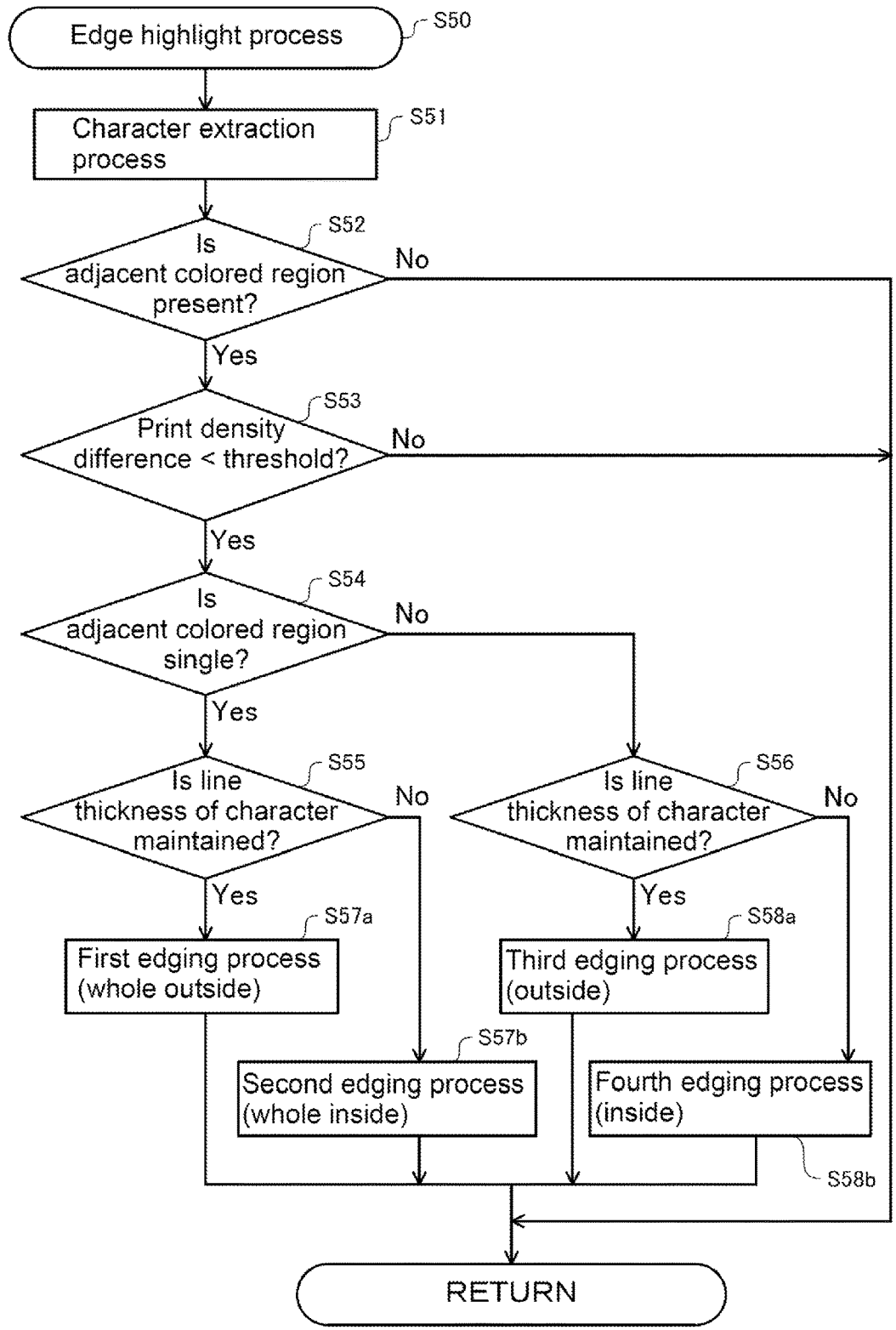
FIG. 3 illustrates contents of an edge highlight process according to the one embodiment.

FIG. 3 illustrates contents of the edge highlight process (Step S50) according to the one embodiment. At Step S51, the character recognition processing unit 113 performs a character extraction process. The character extraction process may be performed based on the above-described monochrome image, or may be performed based on the color image data. The character recognition process based on the color image data may be performed using color information, or may be performed after monochrome binarization using shading information.

In the character extraction process by character recognition, a difference between a character and a non-character is apparent in the case of a black-and-white document, and also a character string is horizontal writing or vertical writing. This facilitates the extraction. However, in the color document, a character string may include a decoration, such as a frame, a shade, and solid shading. Thus, it is not easy to extract a character string body. Furthermore, the character string may be illustrated with gradations other than a single color. For such problem, in the embodiment, at least one of a method that utilizes the character string illustrated with a single color and a method that extracts a region having an identical line width through a morphological operation is employed as a character extraction process method using the color information.

At Step S52, the character recognition processing unit 113 determines presence/absence of an adjacent colored region based on the color image data. The adjacent colored region is an adjacent region that is a region adjacent to a character region representing the extracted character, and is a colored region, that is, a non-white region. When the adjacent region, which is a region adjacent to the character region, is white, it is determined that the visibility of the character is fair.

When the adjacent colored region is determined to be absent, the visibility of the character is fair, and thus the process is advanced to Step S60 (see FIG. 2) without performing the edging process. When the adjacent colored region is determined to be present, the process is advanced to Step S53.

At Step S53, the monochrome conversion unit 112 determines whether a print density difference between the character region and the adjacent colored region is smaller than the threshold or not based on the monochrome image data. That is because a small print density difference between the character region and the adjacent colored region may bring reduced visibility of the character due to the character buried in its peripheral area. Step S53 is a process for determining whether the visibility of the character is sufficient after the monochrome conversion or not. The threshold is a tone value (tone difference) read from the adjacent-coloring-print-density-difference table 141 (see FIG. 1) preliminarily stored in the storage unit 140.

When the print density difference between the character region and the adjacent colored region is determined to be equal to or more than the threshold, the process is advanced to Step S60 (see FIG. 2) without performing the edging process because of sufficient visibility of the character. When the print density difference between the character region and the adjacent colored region is determined to be smaller than the threshold, the process is advanced to Step S54.

At Step S54, the monochrome conversion unit 112 determines whether the adjacent colored region is single or not based on the color image data. A single adjacent colored region means that a tone of the whole of the adjacent colored region contacting respective characters or one of strokes constituting the respective characters is single. A non-single adjacent colored region means that the tone of the adjacent colored region contacting the respective characters or the respective strokes is not single, that is, a plurality of adjacent colored regions having different tones are present.

When the adjacent colored region is determined to be single, the process is advanced to Step S55. When the adjacent colored region is determined not to be single, the process is advanced to Step S56. When a plurality of adjacent colored regions are present, and when a print density difference between at least one of the plurality of adjacent colored regions and the character region is smaller than the threshold at Step S53, the process is advanced to Step S54.

At Step S55, the monochrome conversion unit 112 inquires of the user whether to maintain line thickness of the character or not on the operation display 170. The monochrome conversion unit 112 displays a preview image on which the edge highlight process has been performed on the operation display 170 to enable the user to input "a selection whether to maintain the line thickness of the character or not" and "a width of a white pixel for edging." In the embodiment, the white pixel is a pixel on which toners are not formed.

When the operation display 170 receives a reply for maintaining the line thickness of the character, the monochrome conversion unit 112 advances the process to Step S57a. When the operation display 170 receives a reply for not maintaining the line thickness of the character, the monochrome conversion unit 112 advances the process to Step S57b.

Figure 4:
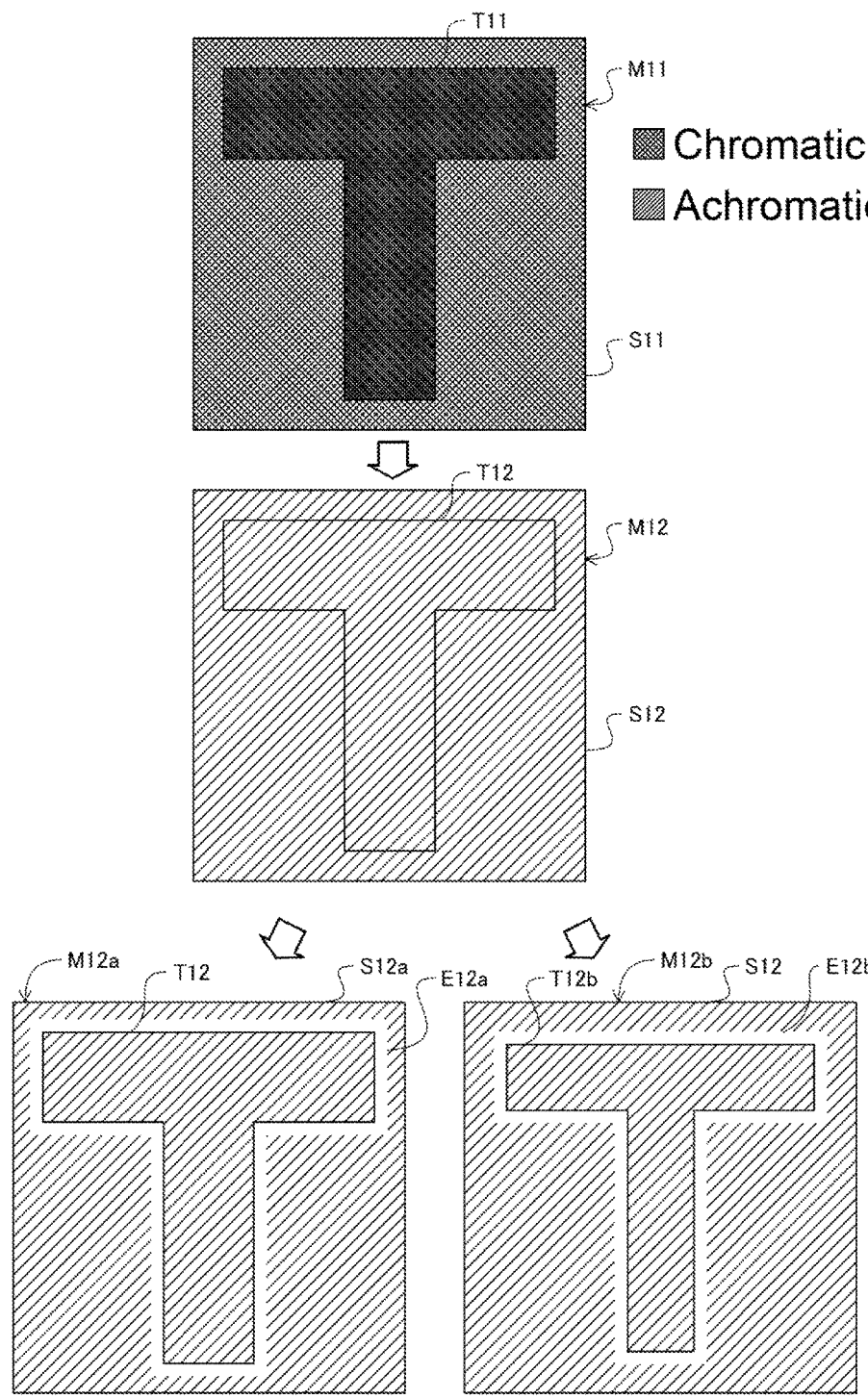
FIG. 4 illustrates contents of a first and a second edging processes according to the one embodiment.

FIG. 4 illustrates contents of a first and a second edging processes according to the one embodiment. A color image region M11 is one example where a part of the color image represented by the color image data is extracted. The color image region M11 includes a character region T11 and an adjacent colored region S11 around the character region T11. A monochrome image region M12 is a monochrome image represented by the monochrome image data, which is generated from the color image data by the monochrome conversion. The monochrome image region M12 includes a character region T12 and an adjacent colored region S12 around the character region T12.

In the color image region M11, assume that at least one difference of hue and saturation of the character region T11 and the adjacent colored region S11 ensures the visibility of the character represented by the character region T11. On the other hand, in the monochrome image region M12, reduced visibility of the character represented by the character region T11 due to, commonly, missing both information on the hue and the saturation of the character region T11 and the adjacent colored region S11 is assumed.

At Step S57a, the monochrome conversion unit 112 performs the first edging process. The first edging process is a process that performs an edging process on a whole outside of a contour while maintaining the line thickness of the character. This edging process is a process that converts pixels contacting an outside of a contour of the character region T12 in the adjacent colored region S12 of the monochrome image region M12 into white pixels having a predetermined width (a distance from the contour) to form an adjacent colored region S12a including a white pixel region E12a. This enables the monochrome conversion unit 112 to generate a monochrome image region M12a. The monochrome image region M12a is an image where a peripheral area of the contour of the character region T12 is converted into the white pixels having the predetermined width. Thus, the image has improved visibility of the character represented by the character region T12.

At Step S57b, the monochrome conversion unit 112 performs the second edging process. The second edging process is a process that performs an edging process on a whole inside of the contour without maintaining the line thickness of the character. This edging process is a process that converts pixels contacting an inside of the contour of the character region T12 in the character region T12 of the monochrome image region M12 into white pixels having a predetermined width to form a character region T12b surrounded by a white pixel region E12b. This enables the monochrome conversion unit 112 to generate a monochrome image region M12b. The monochrome image region M12b is an image where the inside of the contour of the character region T12 is converted into the white pixels having the predetermined width. Thus, the image has improved visibility of the character represented by the character region T12b.

Figure 5:
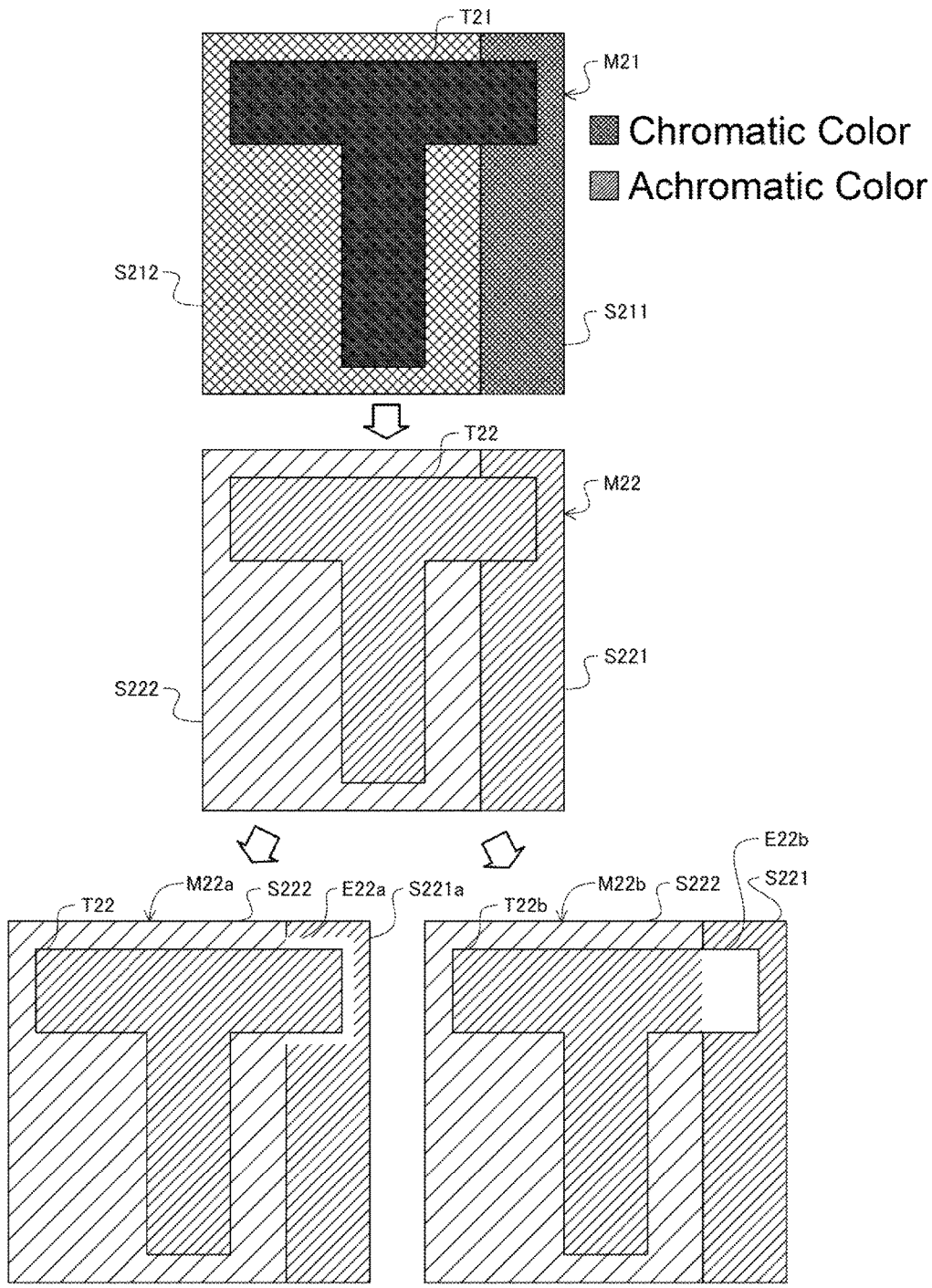
FIG. 5 illustrates contents of a third and a fourth edging processes according to the one embodiment.

FIG. 5 illustrates contents of a third and a fourth edging processes according to the one embodiment. FIG. 5 illustrates one example of the edging process performed when the tone of the adjacent colored region is not single, that is, a plurality of adjacent colored regions having different tones are present (determine at Step S54).

In this example, a color image region M21 includes a character region T21 and two adjacent colored regions S211 and S212 around the character region T21. A monochrome image region M22 includes a character region T22 and two adjacent colored regions S221 and S222 around the character region T22. On the adjacent colored region S221 side, a print density difference between the adjacent colored region S221 and the character region T22 is smaller than the threshold. On the adjacent colored region S222 side, a print density difference between the adjacent colored region S222 and the character region T22 is equal to or less than the threshold.

At Step S56, similarly to Step S55, the monochrome conversion unit 112 inquires of the user whether to maintain the line thickness of the character or not on the operation display 170. When the operation display 170 receives a reply for maintaining the line thickness of the character, the monochrome conversion unit 112 advances the process to Step S58a. When the operation display 170 receives a reply for not maintaining the line thickness of the character, the monochrome conversion unit 112 advances the process to Step S58b.

At Step S58a, the monochrome conversion unit 112 performs the third edging process. The third edging process is an edging process that is partially performed while maintaining the line thickness of the character. This edging process is a process that converts pixels contacting an outside of a contour of the character region T22 in the adjacent colored region S221 of the monochrome image region M22 into white pixels having a predetermined width to form an adjacent colored region S221a including a white pixel region E22a. This enables the monochrome conversion unit 112 to generate a monochrome image region M22a. The monochrome image region M22a is an image where a peripheral area of the contour of the character region T22 in the adjacent colored region S221a is converted into the white pixels having the predetermined width. Thus, the image has improved visibility of the character represented by the character region T22.

At Step S58b, the monochrome conversion unit 112 performs the fourth edging process. The fourth edging process is an edging process that is partially performed without maintaining the line thickness of the character. This edging process is a process that converts all pixels constituting the character region T22 in the region surrounded by the adjacent colored region S221 of the monochrome image region M22 into white pixels to form a white pixel region E22b. This enables the monochrome conversion unit 112 to generate a monochrome image region M22*b*. The monochrome image region M22*b* is an image where all the pixels constituting the character region T22 in the region surrounded by the adjacent colored region S221 are converted into the white pixels. Thus, the image has improved visibility of the character represented by a character region T22*b*.

Figure 6:
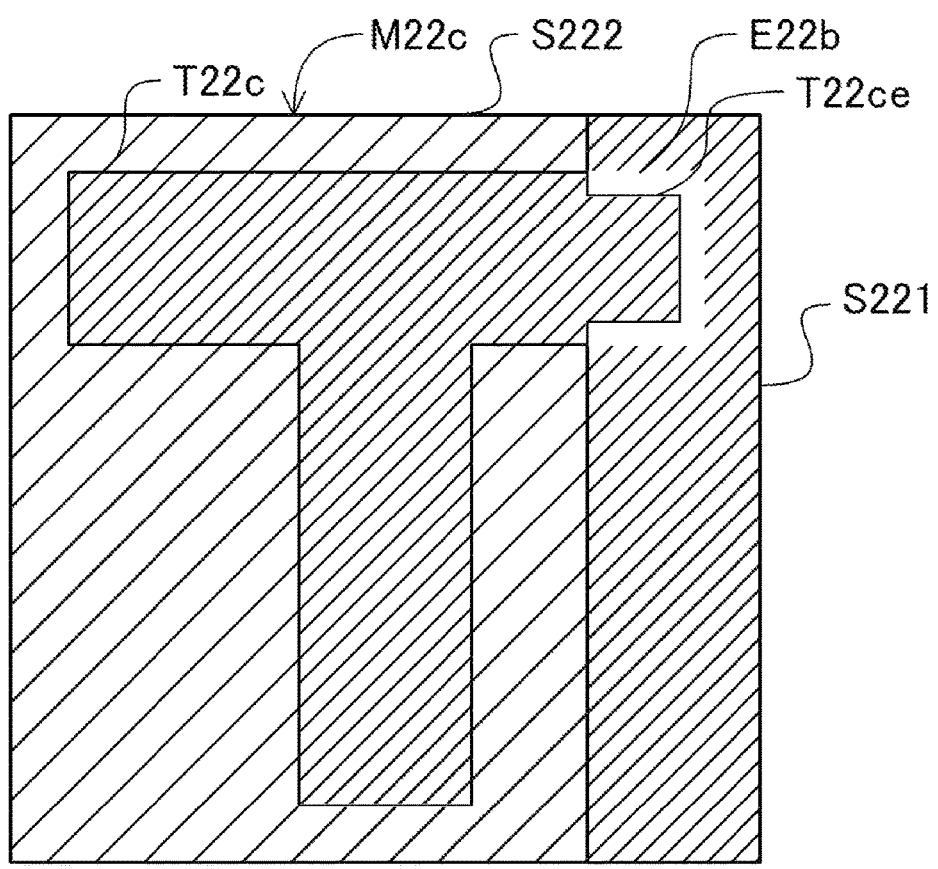
FIG. 6 illustrates a result of an edging process according to a comparative example.

In the embodiment, in Step S58*b*, the character region T22 is not converted into the white pixels having the predetermined width in the region surrounded by the adjacent colored region S221 but all the pixels constituting the character region T22 are converted into the white pixels. Such process is performed because the white pixels having a predetermined width form a region T22*ce* that partially narrows a character width of a character region T22*c* as a monochrome image region M22*c* illustrated in FIG. 6, and this brings a poor appearance. On the other hand, when all the pixels constituting the character region T22 are converted into the white pixels, a character width of the character region T22*b* is uniformly maintained while its color is inverted. This brings a good appearance.

In the adjacent colored region S222 of the monochrome image region M22, the visibility of the character represented by the character region T22 is ensured, and thus the edging process is not performed.

Thus, in the image forming system 1 according to the embodiment, the conversion into the monochrome image data having the improved visibility of the character is achieved.

In addition to the above-described respective embodiments, the following modifications implement the disclosure.

Modification 1

While in the above-described embodiment the disclosure is applied to the image forming apparatus 100, the disclosure may be applied to a device that functions as an image processing apparatus, such as an image reading apparatus (scanner) or the personal computer 200. Specifically, the personal computer 200 performs the above-described processes for printing the color image in monochrome with the personal computer 200, and then a print job including the already-processed monochrome image data may be transmitted to the image forming apparatus 100 in order to print.

Modification 2

While in the above-described embodiment the white pixels have a limited predetermined width when the pixels contacting the outside of the contour of the character region are converted into the white pixels, a process where all the pixels constituting the adjacent colored region outside the contour are converted into the white pixels may be employed.

Modification 3

While in the above-described embodiment the pixels positioned outside or inside the contour of the character region are converted into the white pixels, for example, pixels in a region across the contour may be converted into the white pixels. A region across the outside of the contour of the character region, the inside of the contour of the character region, and the contour is also referred to as a boundary region between the character region and the adjacent region. Furthermore, the pixels do not always need to be converted into the white pixels, and a process that the pixels are changed to have a predetermined tone value (for example, a black pixel or a light gray pixel) may be employed.

Modification 4

While in the above-described embodiment the operation display and a display (not illustrated) of the computer enable a user to input "the selection whether to maintain the line thickness of the character or not" and "the width of the white pixel for edging," the operation display and the display may display a toner amount saved by the white pixels formed by the edging process. This causes the user to recognize that the disclosure is effective to save toners also to help the usage, so as to promote the saving of the toners.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus for processing image data for printing, comprising:
   an image-data acquiring unit for acquiring image data either directly via an image-scanning function of the image processing apparatus, or indirectly by receiving image data as a print job via a communications interface in the image processing apparatus, the image data being either tone-value based color image data or grayscale-value based monochrome image data and representing a text-including image;
   a storage unit storing a control program and a print-density threshold table containing, as color-image tone values, print-density difference thresholds representing difference between print density of text and print density of a colored region adjacent the text in color image data; and
   a control unit including controller storage and a microprocessor, the control unit executing the control program thereby functioning as
      a text character recognition processor for performing a text character recognition process on the image data using either tone-value information or grayscale information in the image data to extract from the image data a text region, the text region being a region where a text character is represented, and
      a text-edging monochrome convertor
         for when the image data is color image data converting the color image data into monochrome image data containing grayscale-value information corresponding to tone-value information in the color image data,
         for determining based on the monochrome image data whether difference in print density between the text region and a text-adjacent region in the monochrome image data is smaller than a predetermined threshold from the print-density threshold table, and when the print-density difference is smaller than the predetermined threshold, performing a text-edging process of changing the grayscale value of a boundary region between the text region and the text-adjacent region, to highlight the text character relative to the text-adjacent region, and
         for transmitting the text-edging processed monochrome image data to an image forming unit to form an image on a print medium, based on the text-edging processed monochrome image data.

2. The image processing apparatus according to claim 1, further comprising:
   an operation display that displays the monochrome image having changed tones of the boundary region; wherein the operation display accepts an input indicating whether to change the tone of the boundary region or not.

3. The image processing apparatus according to claim 1, further comprising an operation display operatively associated with the text-edging monochrome convertor and enabled for querying a user as to operations of the text-edging monochrome convertor, and for accepting input of user operations on the display in response to the querying; wherein the text-edging monochrome convertor is further for
determining based on the monochrome image data whether the grayscale value of the text-adjacent region is singular,
via the operation display, querying the user as to whether text-character line thickness is to be maintained, and
(i) in cases where the grayscale value of the text-adjacent region is singular and text-character line thickness is to be maintained, performing a first edging process of exteriorly highlighting the entire text region's contour against the text-adjacent region, such that the text-character line thickness is maintained,
(ii) in cases where the grayscale value of the text-adjacent region is singular and text-character line thickness is not to be maintained, performing a second edging process of interiorly highlighting the entire text region's contour against the text-adjacent region, such that the text-character line thickness is reduced,
(iii) in cases where the grayscale value of the text-adjacent region is not singular and text-character line thickness is to be maintained, performing a third edging process of exteriorly highlighting a predetermined portion of the text region's contour against the text-adjacent region, such that the text-character line thickness along the predetermined portion of the text region's contour is maintained, and
(iv) in cases where the grayscale value of the text-adjacent region is not singular and text-character line thickness is not to be maintained, performing a fourth edging process of interiorly highlighting a predetermined portion of the text region's contour against the text-adjacent region, such that the text-character line thickness along the predetermined portion of the text region's contour is reduced.

4. The image processing apparatus according to claim 3, wherein:
the first and third edging processes each convert pixels exteriorly contacting the text region's contour into white pixels having a predetermined outside distance from the contour;
the second edging process converts pixels interiorly contacting the text region's contour into white pixels having a predetermined inside distance from the contour; and
the fourth edging process converts all pixels within the predetermined portion of the text region's contour into white pixels.

5. An image forming apparatus comprising:
the image processing apparatus according to claim 1; and
an image forming unit for forming an image on a print medium based on the text-edging processed monochrome image data received from the text-edging monochrome convertor.

6. A method of processing image data for printing, comprising:
acquiring image data either directly via an image-scanning function of an image processing apparatus, or indirectly by receiving image data as a print job via a communications interface in an image processing apparatus, the image data being either tone-value based color image data or grayscale-value based monochrome image data and representing a text-including image;
storing a print-density threshold table containing, as color-image tone values, print-density difference thresholds representing difference between print density of text and print density of a colored region adjacent the text in color image data;
performing a text character recognition process on the image data using either tone-value information or grayscale information in the image data to extract from the image data a text region, the text region being a region where a text character is represented;
when the image data is color image data, converting the color image data into monochrome image data containing grayscale-value information corresponding to tone-value information in the color image data;
determining based on the monochrome image data whether difference in print density between the text region and a text-adjacent region in the monochrome image data is smaller than a predetermined threshold from the print-density threshold table, and when the print-density difference is smaller than the predetermined threshold, performing a text-edging process of changing the grayscale value of a boundary region between the text region and the text-adjacent region, to highlight the text character relative to the text-adjacent region; and
forming an image on a print medium based on the text-edging processed monochrome image data.

7. A non-transitory computer-readable recording medium storing an image processing program to control an image processing apparatus, the image processing apparatus including a control unit and a storage unit storing a print-density threshold table containing, as color-image tone values, print-density difference thresholds representing difference between print density of text and print density of a colored region adjacent the text in color image data, the image processing program causing the image processing apparatus to function as
an image-data acquiring unit for acquiring image data either directly via an image-scanning function of the image processing apparatus, or indirectly by receiving image data as a print job via a communications interface in the image processing apparatus, the image data being either tone-value based color image data or grayscale-value based monochrome image data and representing a text-including image;
and the image processing program causing the control unit to function as
a text character recognition processor for performing a text character recognition process on the image data using either tone-value information or grayscale information in the image data to extract from the image data a text region, the text region being a region where a text character is represented; and
a text-edging monochrome convertor
for when the image data is color image data converting the color image data into monochrome image data containing grayscale-value information corresponding to tone-value information in the color image data,
for determining based on the monochrome image data whether difference in print density between the text region and a text-adjacent region in the monochrome image data is smaller than a predetermined threshold from the print-density threshold table, and when the print-density difference is smaller than the predetermined threshold, performing a text-edging process of changing the grayscale value of a boundary region between the text region and the text-adjacent region, to highlight the text character relative to the text-adjacent region, and for transmitting the text-edging processed monochrome image data to an image forming unit to form an image on a print medium, based on the text-edging processed monochrome image data.

\* \* \* \* \*